United States Patent Office 3,354,193
Patented Nov. 21, 1967

3,354,193
CARBORANE SUBSTITUTED SILOXANES
Marvin M. Fein, Westfield, Joseph Green, Dover, and Nathan Mayes, Ironia, N.J., assignors to Thiokol Chemical Corporation, Bristol, Pa., a corporation of Delaware
No Drawing. Filed Oct. 14, 1964, Ser. No. 403,923
25 Claims. (Cl. 260—448.2)

This invention concerns boron containing siloxane compounds useful as thermally stable plasticizers solids and liquids.

More particularly, this invention relates to novel carborane-siloxanes of the formula:

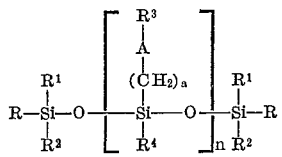

wherein R, $R^1$, $R^2$, $R^3$ and $R^4$ which can be the same or different are selected from the group consisting of hydrogen, aliphatic, aryl and substituted aryl radicals, $n$ is an integer, from 1 upward, $a$ is an integer from 0 and upwards, and A is a carborane radical.

Carborane is the generic term used to describe all the isomers of the clovo-boron-carbon hydride of the empirical formula $B_{10}C_2H_{12}$.

The term "carboranyl" is the name given to the radical of the ortho carborane isomer shown below:

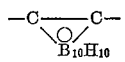

The ortho isomer is also referred to by the Greek letter theta, abbreviated $\theta$.

The radical of the para isomer of carborane is referred to herein as paracarboranyl.

The radical of the meta isomer of carborane is referred to as "neocarboranyl" abbreviated as $\oplus$.

With the increased use of high temperature processes and devices there has been a need for polymeric substances which are stable for extended periods of time at temperatures over 200° C. preferably with good dielectric properties and dimensional stability. The applications for these resins are dependent to some extent upon their physical state. For example, liquid resins having these characteristics are especially useful as thermally stable plasticizers and heat transfer fluids. Higher molecular solid resins can be used for potting resins and as varnishes for manufacturing laminated circuit boards. Thus, the preparation of chemically inert thermally stable compositions both in the liquid and solid state is a substantial advance in the art.

Thus, it is an object of this invention to prepare a novel group of polymeric boron containing siloxanes.

It is another object of this invention to prepare precursors for preparing thermally stable resins having good physical and electrical characteristics.

A more specific object of this invention is the preparation of low molecular weight fluids having good thermal and chemical stability.

Further objects will become apparent to those skilled in the art after a further perusal of this patent application.

The above objects among others are achieved by preparing the novel intermediates of this invention through the process described below.

In practice, a silane reactant having a reactive halogen or alkoxy site is contacted with a carborane-silane reactant having two reactive halogens or alkoxy sites (or a combination of both) attached to the silicon atom, in the presence of sufficient water to cohydrolyse the three available halogen or alkoxy sites and form the above described carborane-silane composition. The preferred reaction path is shown below:

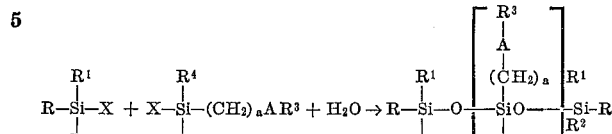

wherein $a$ is an integer from 1 upward, preferably from 1 up to and including 6, $n$ is an integer from 1 upward, preferably from 1 up to and including 4; R, $R^1$, $R^2$, $R^3$, and $R^4$ are selected from the group consisting of hydrogen, aliphatic, aryl and substituted aryl radicals, A is a carborane radical selected from the ortho $(\theta)$, meta $(\oplus)$ and para carborane isomers.

The above reaction is conducted in the presence of an appropriate inert solvent such as a dialkylether, cyclic ether or arylether or a mixture of these ethers at temperatures ranging from about 5°–100° C. preferably from about 20°–50° C. until the novel siloxane-carborane products of this invention are formed. Isolation can be effected using conventional separation techniques practiced in synthetic organic chemistry.

In the preferred process, a mixture of silane reactant and carborane-silane reactant is added to a stirred water-dialkylether mixture at substantially room temperature. After the addition is complete, the stirring is continued for approximately an additional hour. At the end of this time, two layers remain, an ether layer containing product, and an aqueous layer which is discarded. The retained ether layer is then worked up as follows: The ether layer is washed to neutrality and dried to yield a mixture of product, volatiles and by-products. The dried mixture is fractionally distilled to yield a mixture consisting primarily of the monomer, dimer, trimer and tetramer. Lesser amounts, having repetitive mer units up to 6 or higher are also obtained. These higher mer fractions can be readily detected after preparation from the reaction mixture by elemental analysis and molecular weight determinations.

As indicated previously, the water used in the above reaction is a reactant rather than a solvent which is used to supply the hydroxylated compositions which are believed to be transient intermediates in the preparation of the inventive product. The water should be present in at least stoichiometric quantities, however, a large excess or a small deficiency will not preclude a successful preparation although it will diminish yields somewhat. By a stoichiometric quantity is meant sufficient water to convert substantially all the halo or alkoxy groups on both reactants to the transient hydroxy compounds.

As mentioned previously, ordinarily a low and narrow temperature range (20°–100° C.) is used during the cohydrolysis in which both reactants are added to the water. Higher temperatures 100° C. or higher can be used but are not needed. In adidtion, at high temperatures the likelihood of competing side reactions are increased and for that reason, high temperatures are not favored. Low temperatures are also disadvantageous in that they extend the reaction time unduly.

Similarly no need exists to use a pressurized system although pressures higher than atmospheric pressures can be used if desired. Since no process advantage accrues through the use of superatmospheric pressures, their use is avoided.

The molar ratio of the carborane-siloxane reactant to the silane reactant determines the molecular weight (and the value of "$a$" in the formula in col. 1) distribution of the products. That is, when an equimolar ratio of silane to carborane-siloxane is used, a high proportion of the product is polymeric or near polymeric and cannot be readily separated. The use of a large excess of silane produces a large proportion of product where $n=1$ and smaller proportions of product where $n=2, 3$ or 4. Much smaller quantities of products having higher "$n$" values are up to 8 or more concurrently produced. The expected changes in product can be made by adjusting the ratio of the reactants upward or downward. Infrared analysis offers a convenient means of confirming the structure of the products, the value of "$n$" may be determined by measurement of molecular weight and/or elemental analysis.

In addition to the preferred dialkyl ether solvents, cyclic ethers, aromatic ethers and low boiling alkanes can be used as solvents for the preparative reaction.

Because of experimental variables such as temperature, the particular reactants used, pressure, temperature and the like, no precise reaction times can be given. However, the addition is ordinarily complete in laboratory runs within 1–3 hours and the total reaction time generally falling within 4–8 hours.

The silane reactants of this invention (i.e., $RR^1SiX_2$) are well known commercially available products.

The carborane-silane reactants of this invention are disclosed in copending application Ser. No. 344,552, filed Feb. 13, 1964, in the United States Patent Office. The carborane-silanes containing 2 or more methylene groups are prepared as follows:

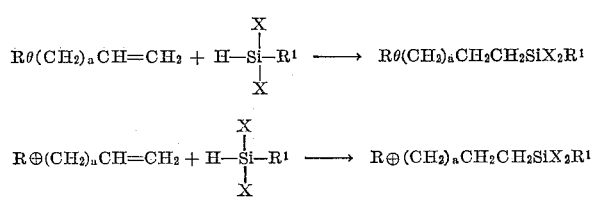

wherein $a$ is an integer including O, X is selected from the group consisting of halogen and alkoxy and R and $R^1$ which can be the same or different are selected from the group consisting of hydrogen, aliphatic, cycloalkyl and aryl radicals, $\theta$ is the symbol for the carborane radical and $\oplus$ is the isomeric neocarborane radical.

The above reactions are conveniently conducted with solvents but in the presence of a noble metal catalyst at temperatures ranging from 20 to 200° C. preferably at temperatures ranging from 30 to 65° C. until substantial quantities of product are formed.

As indicated, the above method cannot be used to prepare the 1-tetra-(substituted silylalkyl) carboranes, neocarboranes, or paracarboranes containing only one alkylene group. To prepare these compounds, a Grignard procedure is used. A Grignard reagent is formed through the reaction of magnesium shavings in ether with a haloalkylcarborane. The carborane-Grignard is then reacted in ether with an excess of trihaloalkyl silane or preferably a trialkoxyalkyl silane to produce the desired reactant. This reactant can be isolated by conventional means such as fractional distillation, extraction and the like.

For example, the 1-(4-methyldiethoxysilylmethyl) carborane product can be prepared by the above process by reacting 15 parts by weight of the Grignard of bromomethyl carborane $BrCH_2\theta H$ with a stoichiometric excess of triethoxymethyl silane at ether reflux temperature. The corresponding 1 - (4-methyldiethoxysilylmethyl) neocarborane can be prepared by the comparable reaction. The other 1 - (4-alkyldialkoxysilylalkyl) carborane (or neocarboranes) with higher alkylene groups can be prepared by this method but yields are relatively poor.

The invention as heretofore defined has many embodiments. Some illustrative embodiments are set forth below.

One embodiment of this invention is the preparation of:

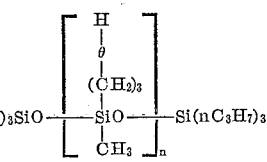
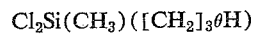

wherein $n=1, 2$ and 3.

These compositions are prepared as follows:

Add a mixture of the carborane-silane, $$Cl_2Si(CH_3)([CH_2]_3\theta H)$$

(0.02 mole) and n-tripropylchlorosilane (0.2 mole) dropwise to a rapidly stirred mixture of water (1.0 moles) and diethyl ether (25 ml.). Continue stirring for an additional 45 minutes and separate the organic layer from the water layer and discard the water layer. Wash the organic layer containing product with water and its pH is neutral. Dry and remove the volatile contaminants under vacuum. Separate the fractions where $n=1, 2$, and 3 by fractional distillation under vacuum. Analysis of the non-distillable residue indicates the presence of small amounts of the compositions where $n$ is $>3$. Average molecular weight indicates $n=4$.

In another embodiment the carborane-siloxane whose formula appears below is prepared:

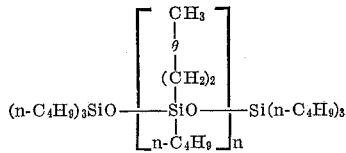
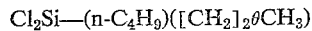

where $n=1$ and 2.

These compositions are prepared as follows:

Add a mixture of the carborane-silane, $$Cl_2Si{-}(n{-}C_4H_9)([CH_2]_2\theta CH_3)$$

(0.02 mole) and $(n{-}C_4H_9)_3SiOCH_3$ (0.2 mole) dropwise to a rapidly stirred mixture of water (1.0 mole) and diethyl ether (25 ml.). Continued stirring for an additional 45 minutes and separate the organic layer from the water layer and discard the water layer. Wash the organic layer containing product with water until its pH is neutral. Dry and remove the volatile contaminants under vacuum. Separate the fractions where $n=1$ and 2 by fractional distillation under vacuum. Analysis of the non-distillable residue indicates the presence of small amounts of the compositions where $n$ is $>2$.

In another embodiment the carborane-siloxane whose formula appears below is prepared:

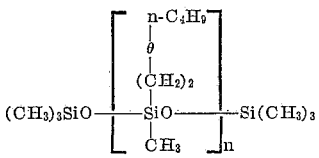
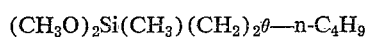

Add a mixture of the carborane-silane, $$(CH_3O)_2Si(CH_3)(CH_2)_2\theta{-}n{-}C_4H_9$$

(0.02 mole) and $(CH_3)_3SiOCH_3$ (0.2 mole) dropwise to a rapidly stirred mixture of water (1.0 mole) and diethyl ether (25 ml.). Continue stirring for an additional 45 minutes and separate the organic layer from the water layer. Wash the organic layer containing product with water. Dry and remove the volatile contaminants under vacuum. Analysis of the non-distillable residue indicates the presence of small amounts of the compositions where $n$ is $>3$.

In another embodiment of the carborane-siloxane whose formula appears below is prepared:

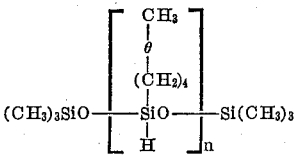

These compositions are prepared as follows:
Add a mixture of the carborane-silane,

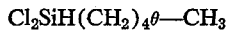

$Cl_2SiH(CH_2)_4\theta$—$CH_3$ (0.02 mole) and $(CH_3)_3SiOCH_3$ (0.2 mole) dropwise to a rapidly stirred mixture of water (1.0 mole) and diethyl ether (25 ml.). Continue stirring for an additional 45 minutes and separate the organic layer from the water layer and discard the water layer. Wash the organic layer containing product with water. Dry and remove the volatile contaminants under vacuum. Separate the fraction where $n=1$, 2, and 3 by fractional distillation under vacuum. Analysis of the non-distillable residue indicates the presence of small amounts of the compositions where $n$ is $>3$.

In another embodiment of the carborane-siloxane whose formula appears below is prepared:

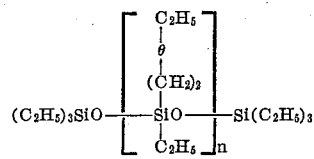

Add a mixture of the carborane-silane, $Cl_2Si(C_2H_4)\theta$—$C_2H_5$

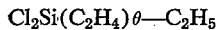

(0.02 mole) and $(C_2H_5)_3SiCl$ (0.2 mole) dropwise to a rapidly stirred mixture of water (1.0 mole) and diethyl ether (25 ml.). Continue stirring for an additional 45 minutes and separate the organic layer from the water layer and discard the water layer. Wash the organic layer containing product with water until its pH is neutral. Dry and remove the volatile contaminants under vacuum. Separate the fraction where $n=1$, 2 and 3 by fractional distillation under vacuum. Analysis of the non-distillable residue indicates the presence of small amounts of the compositions where $n$ is $>3$.

In another embodiment the carborane-siloxane whose formula appears below is prepared:

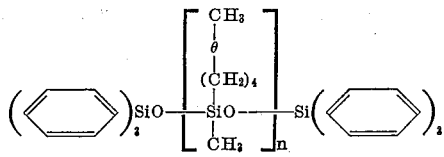

These compositions are prepared as follows:
Add a mixture of the carborane-silane, $Cl_2Si(CH_3)(CH_2)_4\theta$—$CH_3$

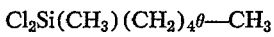

(0.02 mole) and

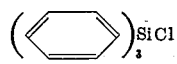

(0.2 mole) dropwise to a rapidly stirred mixture of water (1.0 mole) and diethyl ether (25 ml.). Continue stirring for an additional 45 minutes and separate the organic layer from the water layer and discard the water layer. Wash the organic layer containing product with water until its pH is neutral. Dry and remove the volatile contaminants under vacuum. Separate the fraction where $n=1$ from the higher molecular weight material by fractional distillation under vacuum. Analysis of the non-distillable residue indicates the presence of small amounts of the compositions where $n$ is $>1$.

In another embodiment the carborane-siloxane whose formula appears below is prepared:

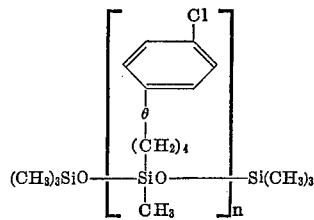

Add a mixture of the carborane-silane, $Cl_2Si(CH_3)(CH_2)_4$

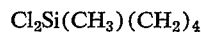

$\theta$-p-chlorophenyl (0.02 mole) and $(CH_3)_3SiCl$ (0.2 mole) dropwise to a rapidly stirred mixture of water (1.0 mole) and diethyl ether (25 ml.). Continue stirring for an additional 45 minutes and separate the organic layer from the water layer and discard the water layer. Wash the organic layer containing product with water until its pH is neutral. Dry and remove the volatile contaminants under vacuum. Separate the fraction where $n=1$ and 2 by fractional distillation under vacuum. Analysis of the non-distillable residue indicates the presence of small amounts of the compositions where $n$ is $>2$.

In another embodiment the carborane-siloxane whose formula appears below is prepared.

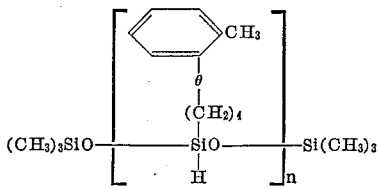

These compositions are prepared as follows:
Add a mixture of the carborane-silane, $Cl_2Si(H)(CH_2)_4\theta$

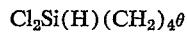

(o-methylphenyl) (0.02 mole) and $(CH_3)_3SiCl$ (0.2 mole) dropwise to a rapidly stirred mixture of water (1.0 mole) and diethyl ether 25 ml.). Continue stirring for an additional 45 minutes and separate the organic layer from the water layer and discard the water layer. Wash the organic layer containing product with water until its pH is neutral. Dry and remove the volatile contaminants under vacuum. Separate the fraction where $n=1$ and 2 by fractional distillation under vacuum. Analysis of the non-distillable residue indicates the presence of small amounts of the compositions where $n$ is $>2$.

In another embodiment the carborane-siloxane whose formula appears below is prepared:

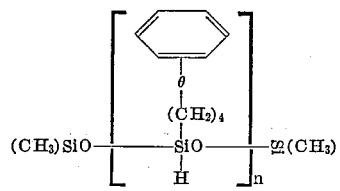

Add a mixture of the carborane-silane, $Cl_2Si(H)(CH_2)_4$ $\theta$-phenyl (0.02 mole) and $(CH_3)_3SiCl$ (0.2 mole) dropwise to a rapidly stirred mixture of water (1.0 mole) and diethyl ether (25 ml.). Continue stirring for an additional 45 minutes and separate the organic layer from the water layer and discard the water layer. Wash the organic layer containing product with water until its pH is neutral. Dry and remove the volatile contaminants under vacuum. Separate the fraction where $n=1$ and 2 by fractional distillation under vacuum. Analysis of the non- distillable residue indicates the presence of small amounts of the compositions where $n$ is $>2$.

In another embodiment the neocarborane-siloxane whose formula appears below is prepared:

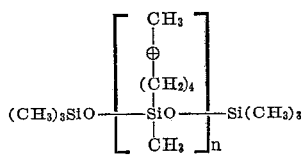

These compositions are prepared as follows:
Add a mixture of the neocarborane-silane, $$Cl_2Si(CH_3)(CH_2)_4 \oplus CH_3$$

(0.02 mole) and $(CH_3)_3SiCl$ (0.2 mole) dropwise to a rapidly stirred mixture of water (1.0 mole) and diethyl ether (25 ml.). Continue stirring for an additional 45 minutes and separate the organic layer from the water layer and discard the water layer. Wash the organic layer containing products with water until its pH is neutral. Dry and remove the volatile contaminants under vacuum. Separate the fraction where $n=1, 2, 3$ and 4 by fractional distillation under vacuum. Analysis of the non-distillable residue indicates the presence of small amounts of the compositions where $n$ is $>4$.

In another embodiment the neocarborane-siloxane whose formula appears below is prepared:

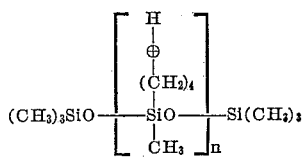

Add a mixture of the neocarborane-silane, $$Cl_2Si(CH_3)(CH_2)_4$$

—⊕—H (0.02 mole) and $(CH_3)_3SiCl$ (0.2 mole) dropwise to a rapidly stirred mixture of water (1.0 mole) and diethyl ether (25 ml.). Continue stirring for an additional 45 minutes and separate the organic layer from the water layer and discard the water layer. Wash the organic layer containing product with water until its pH is neutral. Dry and remove the volatile contaminants under vacuum. Separate the fraction where $n=1, 2, 3$ and 4 by fractional distillation under vacuum. Infrared analysis of the non-distillable residue indicates the presence of small amounts of the compositions where $n$ is $>4$.

In another embodiment the carborane-siloxane whose formula appears below is prepared:

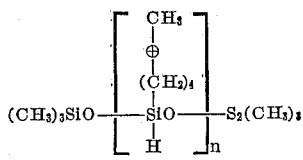

These compositions are prepared as follows:
Add a mixture of the neocarborane-silane, $$Cl_2Si(H)(CH_2)_4 \oplus CH_3$$

(0.02 mole) and $(CH_3)_3SiCl$ (0.2 mole) dropwise to a rapidly stirred mixture of water (1.0 mole) and diethyl ether (25 ml.). Continue stirring for an additional 45 minutes and separate the organic layer from the water layer and discard the water layer. Wash the organic layer containing product with water until its pH is neutral. Dry and remove the volatile contaminants under vacuum. Separate the fraction where $n=1, 2, 3$ and 4 by fractional distillation under vacuum. Infrared analysis of the non-distillable resdiue indicates the presence of small amounts of the compositions where $n$ is $>4$.

In another embodiment the neocarborane-siloxane whose formula appears below is prepared:

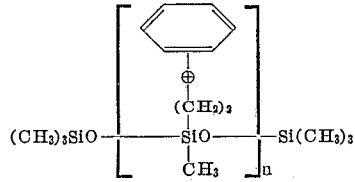

Add a mixture of the carborane-silane, $$Cl_2Si(CH_3)(CH_2)_2$$

⊕-phenyl (0.02 mole) and $(CH_3)_3SiCl$ (0.2 mole) dropwise to a rapidly stirred mixture of water (1.0 mole) and diethyl ether (25 ml.). Continue stirring for an additional 45 minutes and separate the organic layer from the water layer and discard the water layer. Wash the organic layer containing product with water until its pH is neutral. Dry and remove the volatile contaminants under vacuum. Separate the 2 fractions where $n=1$ and 2 from the higher molecular weight material by fractional distillation under vacuum. Infrared analysis of the non-distillable residue indicates the presence of small amounts of the composition where $n$ is $>2$.

In another embodiment the neocarborane-siloxane whose formula appears below is prepared:

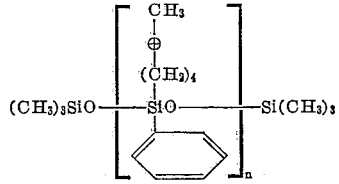

These compositions are prepared as follows:
Add a mixture of the carborane-silane, $$Cl_2Si(C_6H_5)(CH_2)_4 \oplus CH_3$$

(0.02 mole) and $(CH_3)_3SiCl$ (0.2 mole) dropwise to a rapidly stirred mixture of water (1.0 mole) and diethyl ether (25 ml.). Continue stirring for an additional 45 minutes and separate the organic layer from the water layer and discard the water layer. Wash the organic layer containing product wtih water until its pH is neutral. Dry and remove the volatile contaminants under vacuum. Separate the 2 fractions where $n=1$ and 2 by fractional distillation under vacuum. Infrared analysis of the non-distillable residue indicates the presence of small amounts of the compositions where $n$ is $>2$.

In another embodiment the neocarborane-siloxane whose formula appears below is prepared:

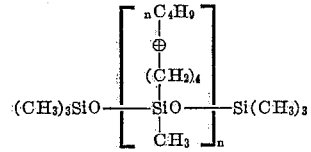

Add a mixture of the carborane-silane, $$Cl_2Si(CH_3)(CH_2)_4\oplus -nC_4H_9$$

(0.02 mole) and $(CH_3)_3SiCl$ (0.2 mole) dropwise to a rapidly stirred mixture of water (1.0 mole) and diethyl ether (25 ml.). Continue stirring for an additional 45 minutes and separate the organic layer from the water layer and discard the water layer. Wash the organic layer containing product with water until its pH is neutral. Dry and remove the volatile contaminants under vacuum. Separate the fraction where $n=1, 2,$ and 3 by fractional distillation under vacuum. Infrared analysis of the non-distillable residue indicates the presence of small amounts of the compositions where $n$ is $>3$.

To more clearly set forth the invention in one of its aspects, an illustrative example showing the preparation and analysis of carborane-silane product is submitted.

*Example 1.—Preparation of (4-carboranylbutyl)methyldichlorosilane*

(A) *Preparation of (4-carboranylbutyl)methyldichlorosilane.*—A regular mixture consisting of 10 parts by weight of 1-(3-butenyl) carborane, 23 parts by weight of commercially obtained methyldichlorosilane and 0.1 part by weight of 5% platinum on charcoal are heated in a citrate bottle at 95° C. for 68 hours. The reaction mixture is filtered off and the product is isolated by distillation at 130–140° C. and 0.02 mm. of mercury. Again infrared analysis and elemental analysis indicate the structure of $H\theta(CH_2)_4SiCl_2CH_3$ is correct.

To an appropriate reaction vessel equipped with means of stirring, heating and cooling is added a mixture of water 18.0 g. (1.0 mole) and diethyl ether (25 ml.). A mixture of (4-carboranylbutyl)methyldichlorosilane prepared as above, and 5.98 g. (0.0191 mole) of trimethylchlorosilane, 17.0 g. (0.158 mole) are added dropwise to the rapidly stirred water-ether mixture. After the addition is complete, the mixture is stirred for 30 minutes. The mixture is separated in a separatory funnel and the aqueous layer is discarded. The organic layer containing product is then washed with water to neutrality and dried over anhydrous calcium sulfate. The dried organic layer is evaporated over a steam bath for several hours to remove volatiles including diethyl ether and by-product hexamethyldisiloxane. The non-volatile residue is distilled through a short path fractional distillation apparatus to yield the following fractions.

| No. | Temperature, ° C. | Pressure, mm. Hg. | Weight, g. |
|---|---|---|---|
| I | 133–142 | 0.0035 | 3.3 |
| II | 260 | 0.004 | 1.3 |
| III | | 0.01 | 0.2 |

The molecular weight distribution was dependent upon the molar ratio of reactants. Thus, when an equimolar ratio was employed, a high proportion of the product was of high molecular weight which could not be distilled but could be separated by other means. The use of a large excess of trimethylchlorosilane here resulted in a large proportion of product where $n=1$ (I) and smaller proportions of product where $n=2$ (II) and 3 (III). Polysiloxanes, I, II, and III were isolated by a short path distillation. I was collected at 133 to 142° C./0.0035 mm. Hg as a water white, mobile liquid ($n_D^{25}$, 1.4782). The infrared spectrum supported the proposed structure given below.

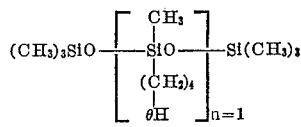

*Analysis.*—For $C_{13}H_{40}O_2B_{10}Si_3$, calculated: C, 37.09; H, 9.58; B, 25.7; mol wt., 421. Found: C, 36.48; H, 9.49; B, 22.4; mol. wt., 470.

II was collected at 260° C./0.004 mm. Hg as a slightly cloudy liquid ($n_D^{25}$, 1.5047).

*Analysis.*—For $C_{20}H_{62}O_3Si_4$, calculated: C, 35.36; H, 9.18; B, 31.8; mol. wt., 679. Found: C, 30.70; H, 7.85; B, 33.8; mol. wt., 710.

III was distilled at an undetermined temperature, however, the still pot had to be heated at well over 400° C. to effect distillation. A very viscous cloudy liquid was obtained ($n_D^{25}=1.5159$).

As the preceding detailed example and the numerous embodiments indicate, numerous changes and modifications in reaction conditons reactants and the like can be made without departing from the inventive concept. The invention is best defined by the claims which follow.

We claim:
1. Carboranes within the formula:

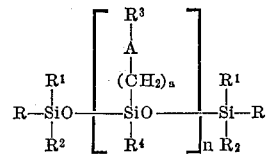

wherein R, $R^1$, $R^2$, $R^3$ and $R^4$ are selected from the group consisting of hydrogen, aliphatic, aryl and substituted aryl radicals, $n$ is an integer greater than 0, $a$ is an integer including 0, and and A is a carborane radical.

2. Carboranyl compositions within the formula:

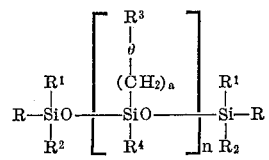

wherein R, $R^1$, $R^2$, $R^3$ and $R^4$ are selected from the group consisting of hydrogen, aliphatic, aryl and substituted aryl, $n$ is an integer greater than 0, $a$ is an integer including 0, and $\theta$ is the ortho isomer (carboranyl radical) of the carborane radical.

3. The carboranyl compositions of claim 2 wherein $a=2$ and $n$ ranges from 1–4.

4. The carboranyl compositions of claim 2 wherein $a=3$ and $n$ ranges from 1–4.

5. The carboranyl compositions of claim 2 wherein $a=4$ and $n$ ranges from 1–4.

6. Carboranyl compositions within the formula:

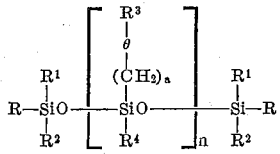

wherein R, $R^1$, $R^2$, $R^3$ and $R^4$ are selected from the group consisting of lower alkyl radicals having from 1 to 6 carbon atoms, $n$ and $a$ are integers, ranging from 1 up to and including 8, and $\theta$ is the ortho carborane isomer.

7. Carboranyl compositions within the formula:

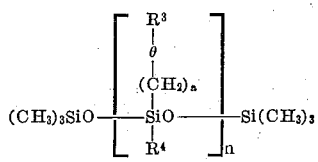

wherein $n$ and $a$ are integers, ranging from 1 up to and including 4, $R^3$ and $R^4$ are selected from the group consisting of lower alkyl radicals having from 1 to 6 carbon atoms, and $\theta$ is the ortho carborane isomer.

8. Carboranyl compositions within the formula:

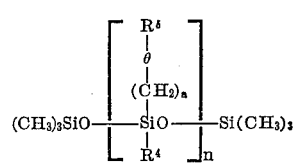

wherein $n$ is an integer ranging from 1 up to and including 4, $a$ is an integer ranging from 0 up to and including 4, $R^4$ and $R^5$ are selected from the group consisting of hydrogen, phenyl, alkylated phenyl, halogenated phenyl, and lower aliphatic radicals having from 1 to 6 carbon atoms, and $\theta$ is the ortho carborane isomer.

9. A carboranyl composition of the formula:

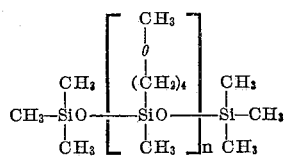

wherein $n$ is an integer ranging from 1 up to and including 4, and $\theta$ is the ortho carborane isomer.

10. A carboranyl composition of the formula:

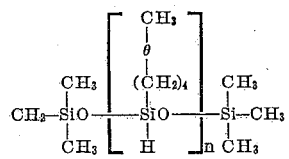

wherein $n$ is an integer ranging from 1 up to and including 4, and $\theta$ is the ortho carborane isomer.

11. A carboranyl composition of the formula:

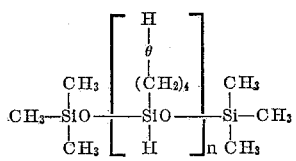

wherein $n$ is an integer ranging from 1 up to and including 4, and $\theta$ is the ortho carborane isomer.

12. A carboranyl composition of the formula:

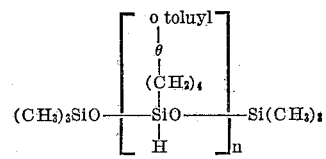

wherein $n$ is an integer ranging from 1 up to and including 4, and $\theta$ is the ortho carborane isomer.

13. A carboranyl composition of the formula:

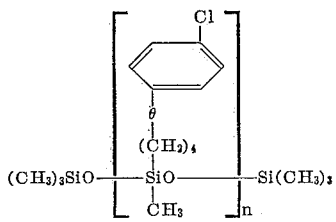

wherein $n$ is an integer ranging from 1 up to and including 4, and $\theta$ is the ortho carborane isomer.

14. A carboranyl composition of the formula:

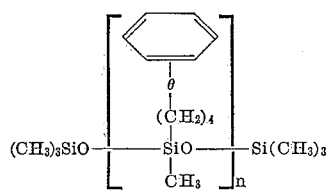

wherein $n$ is an integer ranging from 1 up to and including 4, and $\theta$ is the ortho carborane isomer.

15. A carboranyl composition of the formula:

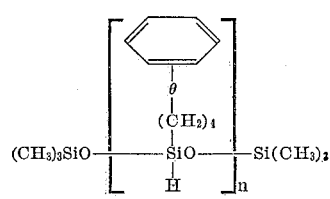

wherein $n$ is an integer ranging from 1 up to and including 4, and $\theta$ is the ortho carborane isomer.

16. A carboranyl composition of the formula:

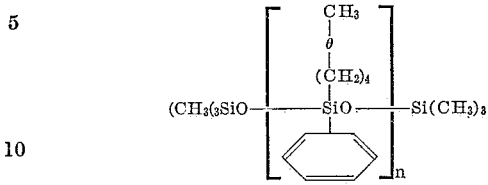

wherein $n$ is an integer ranging from 1 up to and including 4, and $\theta$ is the ortho carborane isomer.

17. Neocarboranyl compositions within the formula:

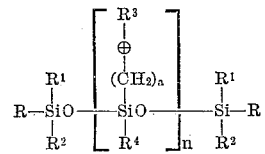

wherein R, $R^1$, $R^2$, $R^3$ and $R^4$ are selected from the group consisting of hydrogen, aliphatic, aryl and substituted aryl, $n$ is an integer greater than 0, $a$ is an integer including 0, and $\oplus$ is the meta isomer (neocarboranyl radical) of the carborane radical.

18. Neocarboranyl compositions within the formula:

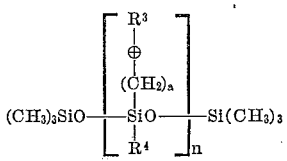

wherein $n$ and $a$ are integers, ranging from 1 up to and including 4, $R^3$ and $R^4$ are selected from the group consisting of lower alkyl radicals having from 1 to 6 carbon atoms, and $\oplus$ is the meta isomer (neocarboranyl radicals) of the carborane radical.

19. A neocarboranyl composition of the formula:

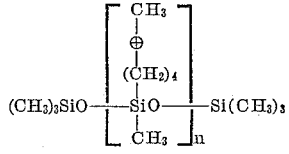

wherein $n$ is an integer, ranging from 1 up to and including 4, and $\oplus$ is the meta isomer (neocarboranyl radical) of the carborane radical.

20. A neocarboranyl composition of the formula:

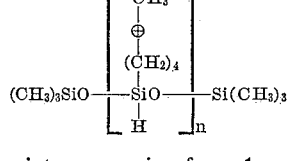

wherein $n$ is an integer ranging from 1 up to and including 4, and $\oplus$ is the meta isomer (neocarboranyl radical) of the carborane radical.

21. A neocarboranyl composition of the formula:

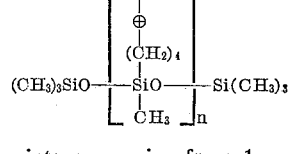

wherein $n$ is an integer ranging from 1 up to and including 4, and $\oplus$ is the meta isomer (neocarboranyl radical) of the carborane radical.

22. A neobarboranyl composition of the formula:

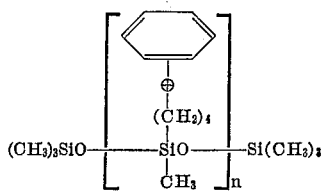

wherein $n$ is an integer ranging from 1 up to and including 4, and $\oplus$ is the meta isomer (neocarboranyl radical) of the carborane radical.

23. A process for preparing novel carborane-siloxanes of the formula:

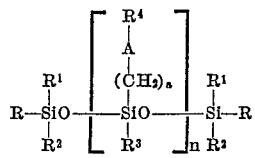

wherein $R^1$, $R^2$, $R^3$ and $R^4$ are selected from the group consisting of hydrogen, aliphatic, aryl and substituted aryl radicals, and $n$ and $a$ are integers greater than 1, A is a carborane radical, comprising contacting a silane reactant of the formula:

wherein X is selected from the group consisting of hydrogen and alkoxy, and R and $R^1$ have the meaning ascribed to them above, with a carborane silane reactant of the formula:

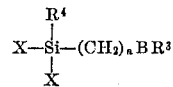

wherein X, $a$, $R^3$ and $R^4$ have the meanings ascribed to them above, in the presence of inert solvent and water, until the carborane-siloxane of the formula described above is formed, and isolating the products contained therein.

24. The process of claim 23 wherein the carborane is the ortho carborane isomer $\theta$.

25. The process of claim 23 wherein the carborane is the meta carborane isomer $\oplus$.

References Cited

UNITED STATES PATENTS

| | | | |
|---|---|---|---|
| 3,137,719 | 6/1964 | Papetti | 260—448.2 |
| 3,154,520 | 10/1964 | Du Pont et al. | 260—448.2 X |
| 3,321,505 | 5/1967 | Fein et al. | 260—606.5 X |

TOBIAS E. LEVOW, *Primary Examiner.*

P. F. SHAVER, *Assistant Examiner.*